United States Patent
Jordberg et al.

[11] Patent Number: 6,142,716
[45] Date of Patent: Nov. 7, 2000

[54] TOOL AND CUTTING INSERT FOR MILLING

[75] Inventors: Jonas Jordberg, Norberg; Stefan Hedberg, Hedemora, both of Sweden

[73] Assignee: Seco Tools AB, Fagersta, Sweden

[21] Appl. No.: 09/391,397

[22] Filed: Sep. 8, 1999

[30] Foreign Application Priority Data

Sep. 8, 1998 [SE] Sweden ................................ 9803056

[51] Int. Cl.⁷ .................................................. B23B 27/22
[52] U.S. Cl. ........................... 407/114; 407/115; 407/116
[58] Field of Search ............................ 407/113–116, 119

[56] References Cited

U.S. PATENT DOCUMENTS

| | | |
|---|---|---|
| 5,078,550 | 1/1992 | Satran et al. . |
| 5,145,295 | 9/1992 | Satran . |
| 5,147,158 | 9/1992 | Rivière . |
| 5,199,827 | 4/1993 | Pantzar ................................. 407/114 |
| 5,207,538 | 5/1993 | Satran . |
| 5,232,319 | 8/1993 | Satran et al. ........................... 407/114 |
| 5,365,805 | 11/1994 | Pantzar et al. ......................... 407/114 |
| 5,382,118 | 1/1995 | Satran et al. ........................... 407/113 |
| 5,597,271 | 1/1997 | Met et al. ............................... 407/113 |
| 5,803,674 | 9/1998 | Satran et al. . |
| 5,810,519 | 9/1998 | Vogel et al. ........................... 407/114 |

FOREIGN PATENT DOCUMENTS 0 392 729 10/1990 European Pat. Off. ............... 407/113

*Primary Examiner*—A. L. Wellington
*Assistant Examiner*—Erica Ergenbright
*Attorney, Agent, or Firm*—Burns, Doane, Sweden & Mathis, L.L.P.

[57] ABSTRACT

A cutting insert for milling comprises two major sides, two minor sides, and upper and lower sides. At least one pair of cutting edges is formed at the transition of the upper side with a major side and a minor side of the cutting insert. The upper side constitutes a chip surface, and the major and minor sides constitute clearance surfaces. Each pair of cutting edges comprises a major cutting edge extending along the major side, and a minor cutting edge extending along the minor side. The major and minor cutting edges intersect in the area of a cutting corner. The cutting corner is provided inside an imaginary extension line of a major part of the minor side. The major cutting edge slopes such that it forms an acute angle with the lower side. Each pair of cutting edges joins a first clearance surface protruding relative to a plane containing a major portion of the minor and major sides. Recesses are formed in the major sides.

11 Claims, 3 Drawing Sheets

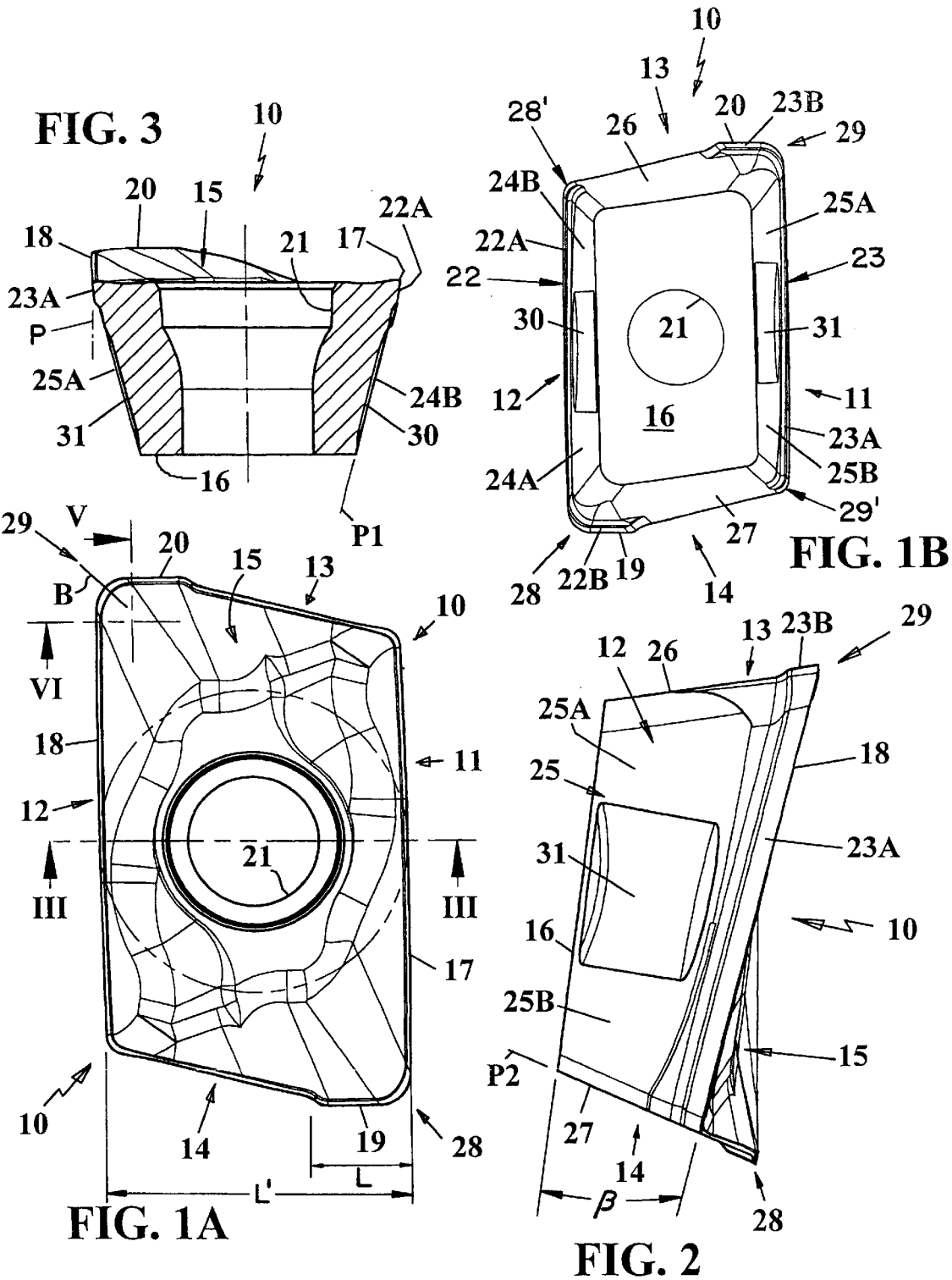

TOOL AND CUTTING INSERT FOR MILLING

FIELD OF THE INVENTION

The present invention relates to a tool and a cutting insert for milling.

PRIOR ART

Each of U.S. Pat. Nos. 5,145,295, 5,207,538 and 5,078,550 show milling inserts of the above-mentioned type. Each known cutting insert comprises planar major sides that during localization in a milling body or a grinding fixture can make the positioning unstable due to dust collections. The instability brings drawbacks for the results from the milling operation and from the grinding of the cutting edges. In addition the known cutting insert demands a lot of grinding when producing the cutting edges. U.S. Pat. No. 5,803,674 discloses a milling insert that has a ledge extending circumferentially and lying in the plane of the associated support surface.

OBJECTS OF THE INVENTION

One object of the present invention is to provide a tool and a cutting insert for milling, which enables rigid localization of the cutting insert in both the milling body and the grinding fixture.

Another object of the present invention is to provide a cutting insert for milling, which reduces the amount of material to grind.

Still another object of the present invention is to provide a cutting insert for milling, which increases the geometrical freedom during grinding.

Still another object of the present invention is to provide a cutting insert for milling, which reduces the environmental pollution at grinding.

Still another object of the present invention is to provide a tool and a cutting insert for milling, at which the extension of flank wear is predetermined.

SUMMARY OF THE INVENTION

These and other objects have been achieved by a cutting insert adapted to be mounted in a pocket of a milling body which is to be rotated in a milling machine. The cutting insert comprises two major sides, two minor sides interconnecting the two major sides, as well as an upper side, and a lower side. The insert includes at least one pair of cutting edges formed by the intersection of the upper side, a major side, and a minor side. The upper side constitutes a chip surface. Each major side and minor side constitutes a clearance surface. The pair of cutting edges comprises a major cutting edge extending along the major side, and a minor cutting edge extending along the minor side. The major and minor cutting edges intersect one another in the area of a cutting corner. The cutting corner is disposed inside an imaginary line of extension of a major portion of the minor side. The minor cutting edge slopes to form an acute angle with the lower side. The pair of cutting edges join a clearance surface which projects outwardly relative to planes containing the major portions of the minor and major sides, respectively. A recess is formed in each of the major surfaces.

The invention also relates to a milling tool which comprises a milling body adapted to be mounted in a milling machine. The milling body comprises at least one pocket having an axial inclination and shaped to receive the above-described cutting insert.

BRIEF DESCRIPTION OF THE DRAWINGS

The objects and advantages of the invention will become apparent from the following detailed description of a preferred embodiment thereof in connection with the accompanying drawing in which like numerals designate like elements, and in which:

FIGS. 1A and 1B show a cutting insert according to the present invention in a top view and a bottom view, respectively;

FIG. 2 shows the cutting insert in a side view;

FIG. 3 shows the cutting insert in a cross section taken along line III—III in FIG. 1A;

DETAILED DESCRIPTION OF A PREFERRED EMBODIMENT OF THE INVENTION

Figure 5:
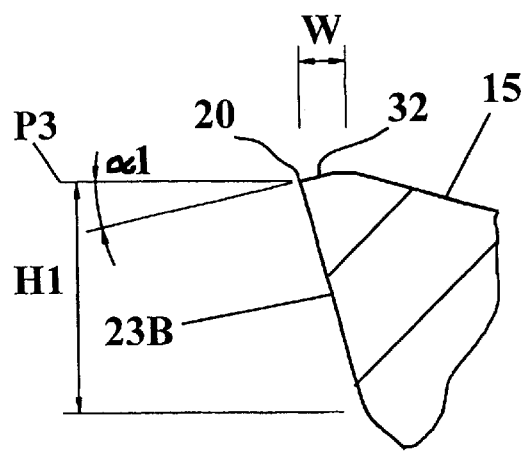
FIG. 5 shows an enlarged cross section of a cutting corner taken along the line V in FIG. 1A.

With reference to FIGS. 1A–4 a one-sided cutting insert 10 for milling according to the present invention is shown, which has a parallelepipedical basic shape and is manufactured from directly pressed cemented carbide. By "cemented carbide" is here meant, WC, TiC, TaC, NbC, etc in sintered combination with a binder metal such as for example Co or Ni. The cutting insert is to be mounted in a milling body, not shown, intended to be rotated in a milling machine. The milling body comprises at least one pocket configured to receive the parallelepipedical cutting insert. The cutting insert 10 comprises two major sides 11, 12 which in a top view are substantially parallel. Interconnecting the major sides are minor sides 13, 14 as well as upper and lower sides 15 and 16. The upper side 15 forms major cutting edges 17, 18 along lines of intersection with the major sides 11, 12. The major cutting edges slope in opposite directions such that each major cutting edge forms an acute angle β with the lower side 16 as shown in FIG. 2. Thus, the opposite sides 11, 12 of the cutting insert have a gradually increasing area, and oppositely directed axial angles. Each major cutting edge increases the tool's operative, positive axial angle when mounted in the cutting insert pocket in the milling body. Furthermore the upper side 15 forms minor cutting edges or wiper edges 19, 20 along lines of intersection with a short portion of each minor side 13, 14. The major cutting edge 17, 18 and the respective associated minor cutting edge 19, 20 form a pair of cutting edges which is active during the milling, while the other pair is passive. The major edge 17 (or 18) ioins its respective wiper edge 19 (or 20) in the area of a cutting corner 28 (or 29). The other two corners 28', 29' constitute non-cutting corners. Each of the two cutting corners define a bisector B which divides the corner into two equal angles. The bisector B does not intersect the center of curvature of the corner 28, 29. When one pair of cutting edges is worn out, the cutting insert is indexed such that the other pair of cutting edges gets into an active position. The upper side constitutes a chip surface in the area of the cutting edges and forms an edge angle with the major and the minor sides which is smaller than 90°, i.e. the cutting insert has a positive basic shape.

Figure 7:
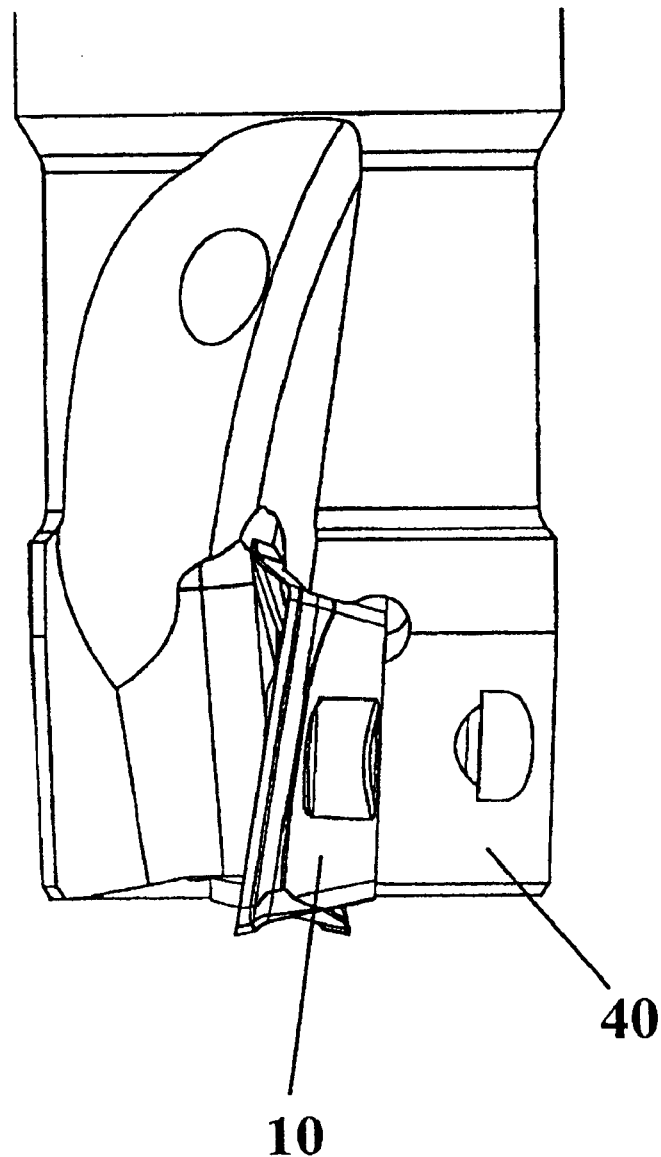
FIG. 7 shows cutting inserts according to the present invention mounted to a milling cutter body.

Furthermore, the chip surface 15 forms a preferably incrementally varying, positive rake angle in order to cut easy in the work piece. The lower side 16 forms an obtuse inner angle with the associated parts 24–27 of the minor and major sides in order to obtain clearance in relation to the work piece (see FIG. 2). A centrally placed hole 21 is provided in the insert body to receive a fastening device such as a screw for mounting the insert in the milling body 40, FIG. 7. The milling cutter is preferably provided for the shoulder milling of 90° corners.

So far the described cutting insert substantially corresponds to the prior art.

The pair of cutting edges 17, 19 connects, in a direction towards the lower side 16, to a ledge structure 22 which includes major and minor ledges 22A, 22B underlying the major and minor edges 17, 19, respectively. The ledge structure 22 forms an outwardly facing clearance surface lying in a plane P which does not intersect the portions of the major and minor sides 11–14 disposed therebeneath. Likewise, the other pair of cutting edges 18, 20 connects, in the same direction, to a ledge structure 23 which includes major and minor ledges 23A, 23B that underlie the major and minor edges 18, 20, respectively. The ledge structure 23 forms an outwardly facing clearance surface. The ledges 22A, 22B, 23A, 23B project substantially outside planes P1, P2 (FIGS. 3, 2, respectively) containing the parts of the minor and major sides, i.e. parts 24–27 disposed below the minor and major ledges. The ledge has a greatest height H1 or H2 (FIGS. 5, 6) in the magnitude of 0.4 to 2 mm or about 10–20% of the overall height of the cutting insert 10. The ledge 22B, 23B disposed at the minor cutting edge has a height H1 that is greater than the height H2 of the ledge 22A, 23A disposed at the major cutting edge (see FIGS. 5 and 6). The ledge structure 23, FIG. 2, extends from the non-cutting corner 29' along the entire major side 12 (see ledge 23A) past the cutting corner 29 and finishes at a distance L into the other minor side 13 (see ledge 23B) Thus, the ledge 23B is shorter than the length L' of the minor side 13 for reducing grinding work. The remaining part of the minor side edge is not intended to cut. Each ledge 22A and 23A has a height in the interval from about 0.02 to 0.1 mm at the place where it is intersected by the line III—III in FIG. 1A.

The distance L of the cutting edge 19 (or 20) is measured perpendicularly from an imaginary extension line of the major cutting edge 17 (or 18) to about a quarter of the length of the respective minor side 13, 14. The ledge thus projects relative to the remaining clearance surfaces, such that advanced grinding of the cutting edges 17–20 can done by conventional grinding methods by grinding the ledge structure simultaneously as a minimum of material need be machined, which in addition reduces the environmental pollution during grinding. Furthermore, the ledge acts as protection for the milling body at a cutting edge breakage.

The lower side 16 forms, as stated above, obtuse inner angles with the parts 24–27 of associated minor and major sides, which parts will constitute positioning surfaces in a grinding fixture and a milling body. Said parts are directly pressed and consequently shall not be ground. Recesses 30, 31 are formed in portions 24, 25, respectively, of the major sides. The recesses 30, 31 are substantially rectangular and are placed longitudinally centrally to reduce the total area of the parts 24, 25 in such a way that the available surface in the plane P1 is displaced in direction towards the corners of the cutting insert. Each recess 30 and 31 is of the same size as, or most preferably somewhat greater than, each abutment surface 24A, 24B and 25A, 25B, respectively, which are formed at each side of each recess. Thereby side abutment surfaces together with the surfaces 26 and 27 are defined for the cutting insert in an advantageous manner. Furthermore, the cutting insert becomes less sensitive for irregularities in the cooperating surfaces in the grinding fixture and in the milling body. Each recess 30, 31 has an essentially concave shape and extends along the height of the insert from a location close to the lower side 16 to a location close to the ledge 22A or 23A such that neither the size of the lower side nor the strength of the ledge is influenced.

Figure 6:
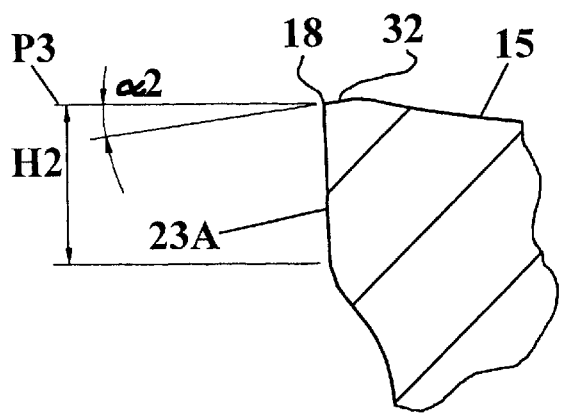
FIG. 6 shows an enlarged cross section of a cutting corner taken along the line VI in FIG. 1A.
Figure 4:
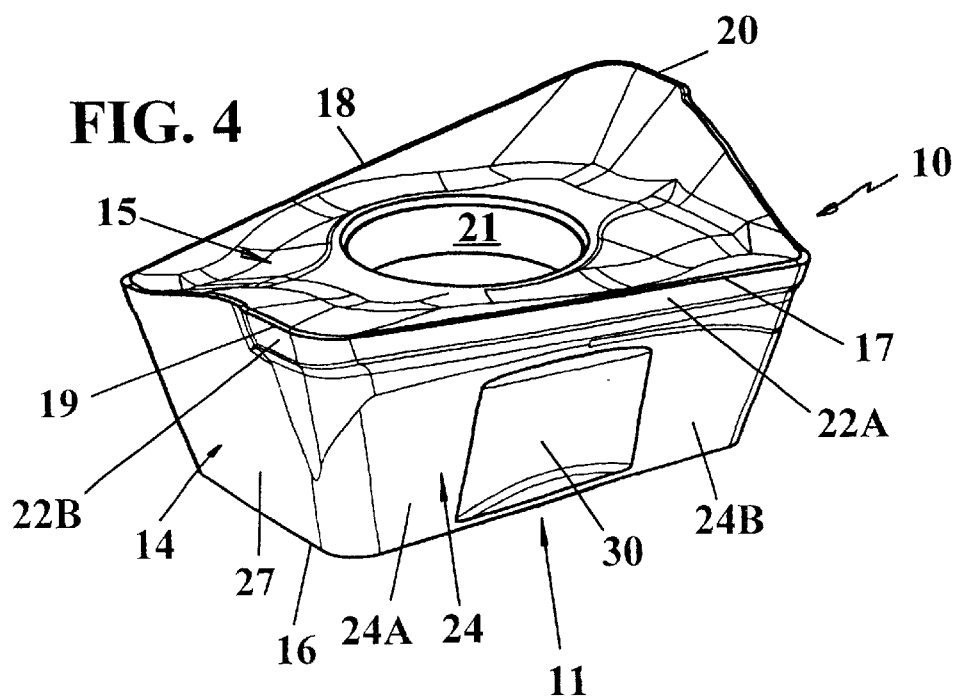
FIG. 4 shows the cutting insert in a perspective view.

The cutting edges 17-20 connect to a reinforcing chamfer 32 (see FIGS. 5 and 6), which has a width W along the major cutting edges 17, 18 and the minor cutting edges 19, 20 and a greater width at the cutting corners 28 substantially symmetrically about the bisector B. Thereby the strength at the cutting corners is increased. Further, as shown in FIG. 5, the chamfer 32 forms an acute angle with a plane P3 oriented parallel with the lower side 16. At the minor cutting edge, according to FIG. 5, that angle $\alpha 1$ is about 13° and at the major cutting edge, according to FIG. 6, that angle $\alpha 2$ is about 9°.

The present invention thus relates to a tool and a cutting insert for milling, which enables rigid localization of the cutting insert in both the milling body and the grinding fixture, whereby the amount of material to be ground from the insert and the grinding possibilities are increased. The surface on which flank wear occurs is predetermined by the height of the ledge.

Although the invention has been described in connection with a preferred embodiment thereof, it will be appreciated by those skilled in the art that additions, modification, substitutions and deletions not specifically described may be made without departing from the spirit and scope of the invention as defined in the appended claims.

What is claimed is:

1. Cutting insert adapted to be mounted in a pocket of a milling body to be rotated in a milling machine, the cutting insert comprising:
an upper side constituting a chip surface,
a lower side constituting a support surface,
first and second major sides each intersecting the upper side, and
first and second minor sides each intersecting the upper side and each interconnecting the first and second major sides;

the insert further including a pair of cutting edges formed by the intersection of the upper side, the first major side and the first minor side, the pair of cutting edges comprising a major cutting edge extending along the first major side, and a minor cutting edge extending along the first minor side,
the major cutting edge and the minor cutting edge intersecting one another to form a cutting corner,
the major cutting edge sloping to form an acute angle with the lower side;

the first major side and the first minor side forming a ledge structure underlying the pair of cutting edges, the ledge structure including a minor ledge underlying the minor cutting edge, and a major ledge underlying the major cutting edge, the minor ledge and the major ledge each forming an outwardly facing clearance surface, the minor ledge having a height less than a remaining height of the first minor side, and the major ledge having a height less than a remaining height of the first major side;

the major ledge extending along at least a portion of the length of the first major side, a lower end of the major ledge being stepped outwardly with respect to a plane defined by a portion of the first major side disposed below the major ledge, a plane defined by the clearance surface of the major ledge being in non-intersecting relationship with a remaining portion of the major side disposed therebelow, whereby the clearance surface of the major ledge can be ground independently of the remaining portion of the major side, the minor ledge extending along only a portion of a length of the respective minor side, a lower end of the minor ledge being stepped outwardly with respect to a plane defined by a portion of the minor side disposed below the minor ledge, a plane defined by the clearance surface of the minor ledge being in non-intersecting relationship with a remaining portion of the minor side disposed therebelow, whereby the clearance surface of the minor ledge can be ground independently of the remaining portion of the minor side;

each of the major sides having a recess formed therein.

2. The cutting insert according to claim 1, wherein the recesses are longitudinally centrally placed in the respective major sides to reduce the area thereof and thereby form abutment surfaces at each side of each recess.

3. The cutting insert according to claim 2, wherein each recess is substantially rectangular.

4. The cutting insert according to claim 2, wherein each recess has an essentially concave shape and extends in a height direction from a location close to the lower side to a location close to the respective major ledge, and each recess is at least of the same size as each abutment surface.

5. The cutting insert according to claim 1, wherein the major ledge extends along the entire length of the major side.

6. The cutting insert according to claim 5, wherein the minor ledge extends along the length of the minor side for a distance measured perpendicularly from an imaginary extension line of the major cutting edge to about a quarter of a length of the minor side.

7. The cutting insert according to claim 1, wherein the clearance surface of the minor ledge has a greater height than the clearance surface of the major cutting edge, wherein height is measured in a direction from the upper side to the lower side.

8. The cutting insert according to claim 7, wherein the clearance surface of the minor ledge has a largest height of about 10–20% of an overall height of the cutting insert.

9. The cutting insert according to claim 7, wherein the clearance surface of the minor ledge has a largest height in the magnitude of 0.4 to 2 mm.

10. The cutting insert according to claim 1, wherein each of the major and minor cutting edges connects to a reinforcing chamfer which has a first width along the major cutting edges and the minor cutting edges, and a larger width at the cutting corners substantially symmetrically about a corner bisector.

11. A milling tool comprising a milling body adapted to be mounted in a milling machine, the milling body comprising at least one pocket having an axial inclination and shaped to receive a cutting insert formed of cemented carbide, the cutting insert comprising:
an upper side constituting a chip surface,
a lower side constituting a support surface,
first and second major sides each intersecting the upper side, and
first and second minor sides each intersecting the upper side and each interconnecting the first and second major sides;

the insert further including a pair of cutting edges formed by the intersection of the upper side, the first major side and the first minor side, the pair of cutting edges comprising a major cutting edge extending along the first major side, and a minor cutting edge extending along the first minor side, the major cutting edge and the minor cutting edge intersecting one another to form a cutting corner, the major cutting edge sloping to form an acute angle with the lower side;

the first major side and the first minor side forming a ledge structure underlying the pair of cutting edges, the ledge structure including a minor ledge underlying the minor cutting edge, and a major ledge underlying the major cutting edge, the minor ledge and the major ledge each forming an outwardly facing clearance surface, the minor ledge having a height less than a remaining height of the first minor side, and the major ledge having a height less than a remaining height of the first major side;

the major ledge extending along at least a portion of the length of the first major side, a lower end of the major ledge being stepped outwardly with respect to a plane defined by a portion of the first major side disposed below the major ledge, a plane defined by the clearance surface of the major ledge being in non-intersecting relationship with a remaining portion of the major side disposed therebelow, whereby the clearance surface of the major ledge can be ground independently of the remaining portion of the major side, the minor ledge extending along only a portion of a length of the respective minor side, a lower end of the minor ledge being stepped outwardly with respect to a plane defined by a portion of the minor side disposed below the minor ledge, a plane defined by the clearance surface of the minor ledge being in non-intersecting relationship with a remaining portion of the minor side disposed therebelow, whereby the clearance surface of the minor ledge can be ground independently of the remaining portion of the minor side;

each of the major sides having a recess formed therein.

* * * * *